United States Patent [19]

Tseng

[11] Patent Number: 5,341,698
[45] Date of Patent: Aug. 30, 1994

[54] FULL MESHING GEAR TYPE VARIABLE SPEED TRANSMISSION FOR ELECTRIC CARS

[76] Inventor: Sheng-Tsai Tseng, No. 5-3, Chia An W.Road, Chia An Tsun, Long Tang Hsian, Taoyuan Hsien, Taiwan

[21] Appl. No.: 986,008

[22] Filed: Dec. 4, 1992

[51] Int. Cl.$^5$ .............................................. F16H 3/08
[52] U.S. Cl. .................................... 74/359; 192/35
[58] Field of Search .................. 475/198, 199, 206; 74/325, 330, 359; 192/415, 35, 48.92

[56] References Cited

U.S. PATENT DOCUMENTS

| | | | |
|---|---|---|---|
| 1,762,799 | 6/1930 | Starkey | 192/415 |
| 1,862,054 | 10/1931 | Chryst | 192/415 |
| 2,881,640 | 4/1959 | Chambers | 192/415 X |
| 4,673,073 | 6/1987 | Weatherby | 192/35 |
| 4,966,574 | 10/1990 | Von Kaler | 475/206 |
| 5,000,057 | 3/1991 | Tseng | 74/359 |

Primary Examiner—Leslie A. Braun
Assistant Examiner—Khoi Ta
Attorney, Agent, or Firm—Bacon & Thomas

[57] ABSTRACT

Disclosed herein is a full meshing gear type variable speed transmission using interlocked gear pairs of the driving and driven gears to transmit power from the mainshaft to the auxiliary axle housing. The mainshaft can only drive the first driving gear through the spiral springs to drive the rest of the other driving gears indirectly. Each spiral spring of the different gear is normally disengaged, when the rotational speed of the auxiliary axle housing is exceeding a set limit, the spiral spring will be engaged with its gears change shift by the automatic gravity type shifting assembly. Each driven gear will also transmit its own power thru the transmission mechanism. Each transmission mechanism allows the driven gear of the higher shift to rotate faster than the driven gear of the lower shift, thus the interlocked pair of gears will not disengage during shifting.

4 Claims, 6 Drawing Sheets

FULL MESHING GEAR TYPE VARIABLE SPEED TRANSMISSION FOR ELECTRIC CARS

BACKGROUND OF THE INVENTION (1) Field of the invention

The present invention is related to a variable speed transmission used in the automobile, particularly a device to improve the transmission efficiency in electric cars.

(2) Description of the prior art

The research and development on electric cars were started in 1830. As compared to the engine automobiles, the electric cars have the advantages of energy conservation, minimum environmental pollution, low noise and stable in operation. On the other hand, the battery in electric car weighs as high as a few hundred kilograms, and the energy density is only 40 to 45 Watt per hour, the disadvantages of insufficient horsepower, low operating efficiency, short distance in continuous operation as well as battery recharging existed in electric cars. After the invention of the automatic ignition in combustion engine, the automobiles with combustion engines have dominated the market in the twentieth century. Due to the energy crisis and the pollution caused by the fuel engine, the world is paying more attention and reconsidering the advantages of electric cars, regardless of their disadvantages.

In order to reach the stages of practical application, the electric cars have to overcome the drawbacks of insufficient power, low operating efficiency and short continuous operating distance. One way to overcome the above obstacle is to develop highly efficient batteries, and another more direct way is to decrease the weight of the variable speed transmission and increase the transmission efficiency. So far there is no break through in the development of high grade batteries, conventional lead acid battery has a low energy density, the recently developed batteries have their disadvantages and are not practical yet. For instance, although the sodium sulfate batteries have a higher energy density, they have to be operated under a high temperature environment of 260 C. and they are explosive under an accidental impact, the zinc type batteries require additional accessories such as compressor, pump, separator, purified storage tank, etc.; and they are difficult to be recharged. The Lithium battery operating under high temperature takes a long time to recharge and the battery life is short. The general Nickel Cadmium battery is expensive and its energy density is about the same as the lead acid battery. Although the Silver Zinc battery has a better energy density, its price is very expensive and can be recharged about 100 times only. Therefore, based on the current manufacturing technologies, development on the high efficiency, light-weight variable speed transmission is one of the best way to improve the efficiency of electric cars.

The operating principle and structure of the electric car are different from the fuel engine driven automobile. The electric car uses the dc motor to replace the engine, the battery to substitute the fuel, main control circuit to replace the function of the carburetor; among them the battery is used to power the dc motor, the Silicon-Controlled Rectifier (SCR) in the main control circuit is used to adjust the terminal voltage of the dc motor so as to control the speed of the electric car. Although the main control circuit can control the revolution and the speed of the dc motor, the horse-power cannot be adjusted and controlled based on the operating condition, this is causing a low start up, slow down in speed and unbalanced in power consumption during operation. The above drawbacks can be compensated and improved by installing a variable speed transmission drive to provide a different rotating speed between the motor shaft and the drive shaft, this device can give a higher torque and horsepower during the low speed operation, it can also reduce the number of revolutions of the motor at high speed operation. This installation can therefore improve the battery efficiency, the low start up torque, slow speed and unbalanced electric power consumption in the operation of the electric cars.

The conventional variable speed transmission is classified into three types: the manual transmission, the automatic transmission and the continuously variable transmission. The manual transmission changes the ratio between the rotating speeds of the engine and the wheels by the use of gears, it has the highest efficiency in transmissions. In the operation of the automobile with Manual transmission, the driver has to apply and release the clutch as well as shift the lever based on the speed of operation, this is causing an emotional and physical burden to the driver, especially during the traffic jammed condition.

Drivers in automobiles with Automatic transmissions do not have to worry about the clutch and the shift lever. The car is easy to operate and thus reduce the risk of accident. The automatic transmissions use fluid power and its fluid torque converter has a slip phenomenon in the system, the efficiency is not ideal and the lagging causes the automobiles with Automatic transmission consume more power, slow down in accelerating and decelerating as well as the drawback of frequent braking.

Continuous variable transmission consists of a pulley belt and a pair of grooved wheels, the pulley and its wheels generate a high torque of transmission, the centripetal force generated from the pulley induced a highly compressed force on the triangular shaped pulley, therefore the pulley has to have a certain degree of thickness to avoid breaking from the centripetal force. The increase of thickness in the pulley will relatively increase its centrifugal force so as to cause a higher surface tension of the pulley. Besides the increase of thickness in the pulley also cause an increase in the diameters of the wheels. In addition, the belt is traveling through the grooved wheels and is causing more friction, this is a negative impact in the overall efficiency and the operational life of the continuous variable transmission.

The above mentioned conventional transmissions cause complicated structures, heavy weight, large physical size and low transmission efficiency. If installed in the electric cars, they would certainly impose a heavy load on the batteries, and this is the reason electric cars use speed reducer instead of the variable transmissions.

SUMMARY OF THE INVENTION

The object of the present invention is to provide a full meshing gear type variable speed transmission to reduce the number of gears and improve the transmission efficiencies. Since the device is light in weight and small in physical size, it is especially suitable for use as a variable speed transmission in the electric cars.

Another objective of this invention is to provide a variable speed transmission for use in the above mentioned electric cars, it is using the full meshing gear type to transmit the power for the best overall efficiency, to improve the overall energy efficiency without adding the energy density to the battery and to prolong the operating distance of the electric cars.

Another objective of this invention is to provide a variable speed transmission for use in the above mentioned electric cars using the full meshing gear type to transmit the power directly. Additionally, the transmission will adjust itself to the appropriate gear based on the driving conditions, the clutch and the shift lever are not necessary. Therefore, it has the advantages of both types of transmissions, manual or automatic and there is no disadvantage yet.

Another objective of this invention is to provide a variable speed transmission for use in the above mentioned electric cars using fewer gears in the transmission but maintaining more control over its speed.

An additional objective of this invention is to provide a variable speed transmission for use in the above mentioned electric car, it is using fewer gears without sacrificing the variable speed characteristics, therefore its structure is as simple as a speed reducing device, maintaining the distinguishing features such as lightweight, compact, ease of operation and high transmission efficiency.

The device that possesses the above distinctive characteristics is especially suitable for use as a variable speed transmission in electric cars. The device comprises of: a mainshaft that connects to the motor or other power source, a differential assembly that connects the wheels to the axle shafts, the axle shafts are supported in the auxiliary axle housings by bearings so that the differential assembly can turn, one of the axle shafts goes through the center hole of the auxiliary axle housing, but has no direct transmission relationship with the housing; several pairs of driving and driven gears are installed on the mainshaft and auxiliary axle housing. At any time during the operation of the variable speed transmission, each pair of the driving gear and the driven gear are meshed together and do not disengage. Power is transmitted from the lower driven gear to the higher driven gear to bring the rotation of the auxiliary axial housing. The power transmitting mechanism is either a spiral spring or a bearing. This transmission mechanism can allow the higher driven gear to rotate faster or the same speed as the lower driven gear, that is to say, when the variable speed transmission is running with its higher gear, the transmission mechanism of the lower gear can have a slippage phenomenon to create a differential speed, hence the meshed gear pair can bring to a higher transmission efficiency, eliminating the operation of clutch and shift lever. The first driving gear is directly bolted to the mainshaft and the rest of the driving gears are disengaged from it. From the second driving gear and up to the last gear, each can be shifted by its own automatic gravity type shifting assembly, that means this variable speed transmission can be shifted automatically to an appropriate gear based on the driving speed, these in turn prolong the battery life and maintain the most efficient horsepower output, creating the best performed, high efficiency full meshing gear type variable speed transmission.

Installing between the mainshaft and the second driving gear is a uni-directional spiral spring transmitting mechanism, this mechanism is normally disengaged from the mainshaft but pressed close to it. Similarly, several other spiral springs are installed between the lower gears and their adjacent higher gears, the spiral springs are normally disengaged from the lower gears but pressed close to the lower gears. These spiral springs can be driven by the individual automatic gravity type shifting assembly to interlock with the mainshaft or the next driving gear, converting the power from the mainshaft to the second driving gear and so on, thus the driving gears can transmit the power via the associated driven gear to the auxiliary axle housing, and therefore the auxiliary housing can obtain an appropriate variable speed ratio.

Since the dc motor can rotate in both directions, this variable speed transmission does not require the reverse driven elliptic gear. A reverse driven mechanism is directly bolted to the auxiliary axle housing, this mechanism can be driven by the first driven gear when the dc motor is rotating in its reverse direction, converting the backward running power to the auxiliary housing so that the car can be driven backward.

BRIEF DESCRIPTION OF THE DRAWINGS

The invention, as well as its many advantages, may be further understood by the following detailed description and drawings in which:

FIG. 6 is a sectional view illustrating the second embodiment of a transmission according to the present invention.

DETAILED DESCRIPTION OF THE PREFERRED EMBODIMENT

The variable speed transmission assembly 10 according to the present invention is capable of changing the speed based on different gear positions. For the purpose of illustration, assembly 10 consists of a three-speed forward transmission with a reverse shift, the same principle can be applied to a variable speed transmission with a four-speed forward and a reverse shift. The variable speed transmission assembly 10 consists of: an equivalent of dc motor power source, a mainshaft 11 that can be rotated clockwise or counter clockwise by the dc motor 90 thru the speed reducer 91. Power is transmitted by the mainshaft 11 in the first to the third whole gears to the auxiliary axle housing 12 thru the speed reduction ratio of the gears. The auxiliary axle housing 12 rotates synchronously with the differential housing 32 to generate the rotation of the axle shafts 33 and 34. The variable speed transmission assembly 10 consists of automatic shifters 22 and 23 for the second and the third gears which can adjust the operating speed automatically.

The transmission consists of a driving gear and a driven gear that are meshed with each other. The driving gear is directly or indirectly rotated by the mainshaft 11 while the driven gear is rotated by the auxiliary axle housing 12. The gear tooth numbers for the main gear increase from the first to the third gear and decrease for the driven gear. This combination creates a change in gear ratio as well as a change in rotating speed, auxiliary axle housing 12 obtain a high torque under the low-speed gear and the mainshaft 11 will slow down its rotation under the high-speed gear operations.

The first driving gear 13 is directly bolted to the mainshaft 11 and both start synchronously. But the second and the third driving gears 14 and 15 are fitted and supported in the main shaft 11 by ball bearings 16 and 17, making mainshaft 11 not able to turn the second and third driving gears 14 and 15 directly. The second and third driving gears 14 and 15 consist of extension housings 18 and 19 in the direction of the mainshaft 11. Housings 18 and 19 is engaged with the uni-directional transmission mechanisms 20 and 21 respectively. These mechanisms 20 and 21 of the second and third driving gears have a tendency to compress towards the inner ends of the housings. Normally the movement of mechanisms 20 and 21 are controlled by the second and third gears automatic shifters 22 and 23, they are disengaged from the mainshaft 11 and extension housing 18. When the rotational speed of mainshaft 11 exceeds a set limit, the second and third gears automatic shifters 22 and 23 lose their function to control due to the centrifugal action. The centrifugal force leads to more compression on the one-way transmission mechanisms 20 and 21 and causes their interlocking with mainshaft 11 and extension housing 18. Therefore power in the mainshaft 11 is transmitted thru mechanisms 20 and 21 to the driving gears 14 and 15 and their rotational speed is identical.

The first and second driven gears 24 and 25 are supported by ball bearings in the auxiliary axle housing 12. The first and second driven gears 24 and 25 consist of extension housings 28 and 29 along the axle, the interior surface of the extension housing 28, together with the second driven gear 25, is engaged ith a unidirectional spiral spring 30. When the first driven gear 24 is rotating in a forward direction, its power is transmitted thru the spiral spring 30 to the second driven gear 25. Similarly, the extension housing 29, together with the auxiliary axle housing 12 is interlocked with the spiral spring 31. When the second driven gear 25 is rotating in a forward direction, its power is transmitted thru the spiral spring 31 to the auxiliary axle housing 12; the third driven gear 26 is directly locked to auxiliary axle housing 12 by key 27, then auxiliary axle housing 12 is attached to the differential housing 32 by screws 35, thus making the auxiliary axle housing 12, the third driven gear 26 and the differential housing 32 rotate synchronously.

A reverse gear uni-directional spiral spring 36 is pressing against the exterior surface of the extension housing 28 of the first driven gear. This spiral spring consists of a reverse gear driven mechanism 37 that is engaged with the extension end 38, the mechanism 37 is bolted to the auxiliary axle housing 12 by flat key 39 to form the reverse gear assembly. Since the reverse gear spiral spring 36 and the spiral springs of the forward gears are facing in an opposite direction, when the dc motor 90 is rotating in a forward direction, the spiral spring 36 will have a relative sliding movement with the extension housing 28 of the first gear and stop to rotate. This forward rotation in the dc motor 90 will not transmit its power to the reverse gear mechanism 37. On the other hand, when the dc motor 90 is rotating in the reverse direction, spiral spring 36 will transmit the power thru the reverse gear driven mechanism 37 to the auxiliary housing 12 enabling the car to back up. When the dc motor 90 is rotating in a reverse direction, the transmission mechanism 30 of the first driven gear will slide on the extension housing 29 of the second driven gear and therefore power is not transmitted to the extension housing 29.

The power from the auxiliary axle housing 12 is transmitted to the differential housing 32 thru the third driven gear 26. The differential assembly is a bevel gear which consists of: a differential shaft 41 connected to the differential housing 32, the bevel differential gears 42 and 43 that are stationary at both ends of the differential shaft 41. The two bevel gears 44 and 45 are located at the ends of axle shafts 33 and 34 and are meshed with the bevel differential gear 42 and 43. When the car is running forward, the axle shafts on both sides (not shown) have the same friction and resistivity to the surface of the road. Therefore the bevel gears 42 and 43 and the differential shaft 41 will not have self rotation but is driven by differential housing 32. The bevel gears 44 and 45 that drive the axle shafts are rotating at the same speed, and this enables the car to continue to go straight ahead. But when the car is running on a curve or rough road conditions, the axle shafts encountered a differential resistivity due to the centrifugal force. The bevel differential gears 42 and 43 will not only be driven by differential housing 32 but also have a self rotation. This self rotation creates a higher rotational speed in the outer bevel gear than the inner bevel gear to balance and compensate for the differential resistivity, the car can thus make the turn smoothly.

Figure 1:
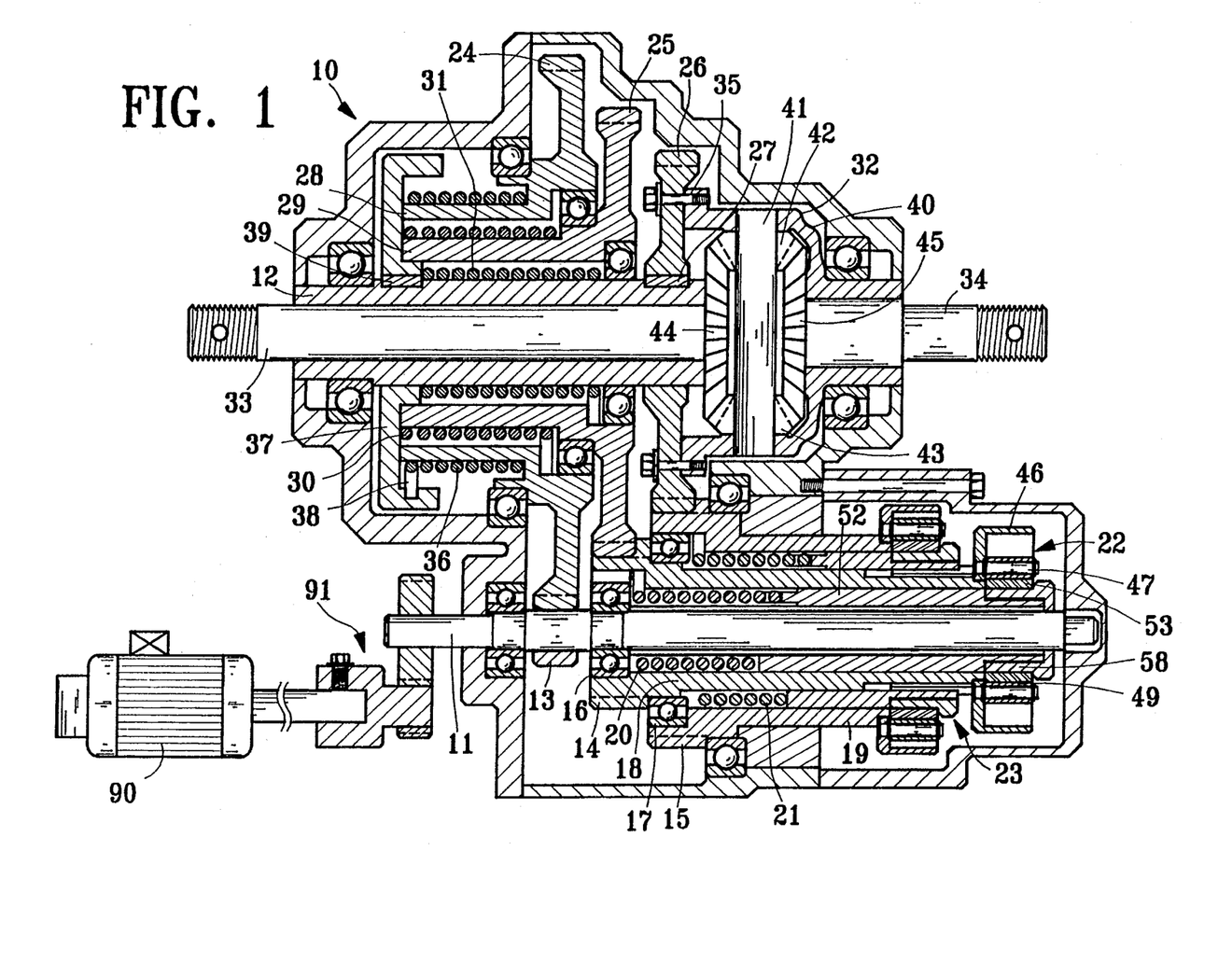
FIG. 1 is a sectional view illusting the first embodiment of this invention, a full meshing gear type variable speed transmission used in electric cars at the forward first gear.
Figure 2:
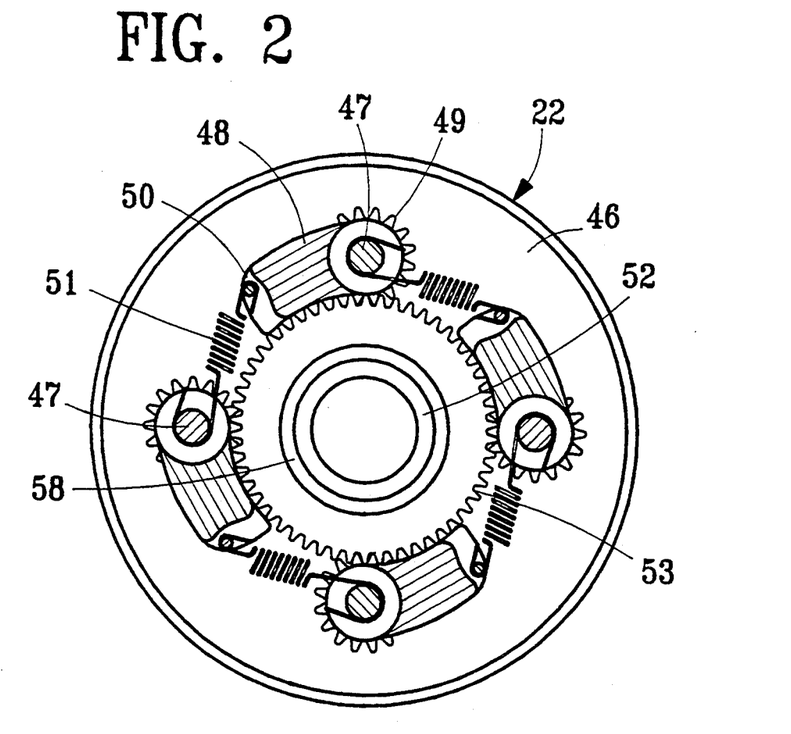
FIG. 2 is an enlarged sectional view of the transmission with the second gear automatic gravity type shifting device in its neutral position.
Figure 3:
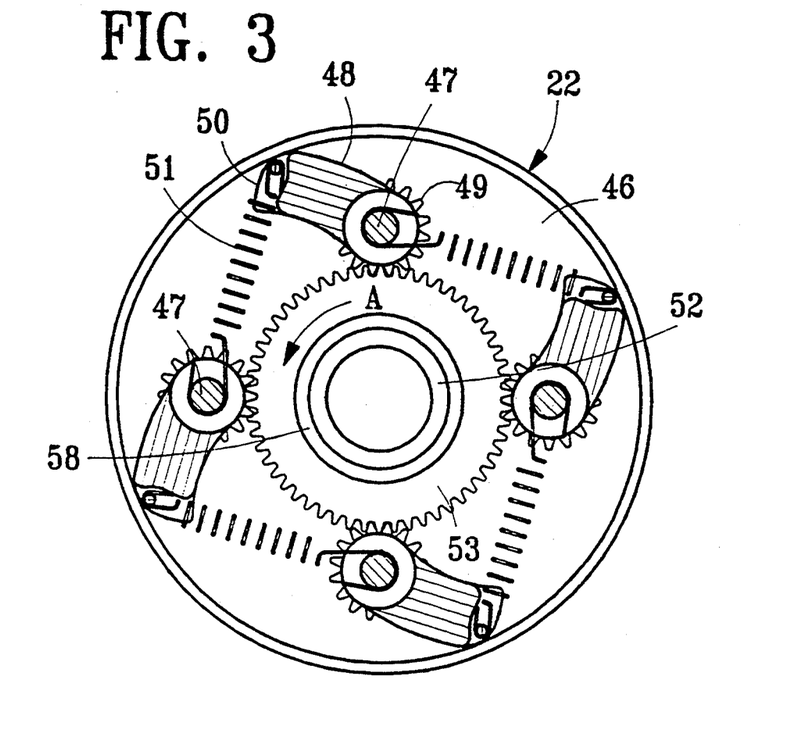
FIG. 3 is an enlarged sectional view of the transmission with the second gear automatic gravity type shifting device in its in-gear position.
Figure 5:
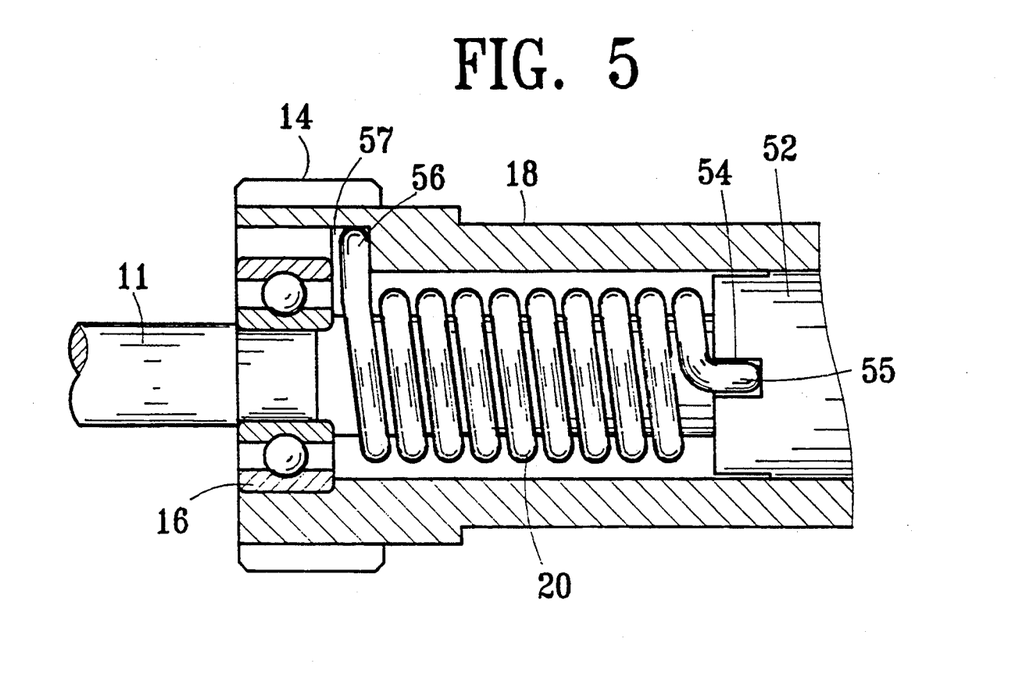
FIG. 5 is an enlarged sectional view similar to FIG. 4, except the second driving gear and its one-way spiral transmission is engaged with the main shaft.

Referring to FIG. 1, FIG. 2 and FIG. 3. This invention provides a full meshing gear type variable speed transmission 10. This variable speed transmission 10 uses the spiral springs at different gears in combination with the automatic gravity type shifting assemblies 22 and 23. This variable speed transmission 10 is capable of adjusting the shifts automatically based on the driving speed. The second and the third automatic gravity type shifting assemblies are entirely identical. For ease of understanding, the section illustrates the second automatic shifting assembly 22 only. This assembly consists of a base plate 46 that is directly bolted to the extension housing 18 of the second driving gear. Several ring-shaped self rotating axles 47 are aligned at equal distance on the base plate 46. Each individual axle 47 consists of a dead weight 48 and a gear 49, the loose end 50 of the dead weight 48 has an extension spring 51 pull to the next axle 47, the extension spring 51 has a tendency to pull to the loose end 50 towards the inner side, but gear 49 is meshed with driven gear 53 that is tightly fitted inside ring 58, ring 58 is locked to the second gear driven mechanism 52, as shown in FIG. 1. When the electric car is running with first gear, the power from the normal rotation of mainshaft 11 is transmitted thru the first driving gear 13 to the first driven gear 24, then sequentially from driven gear 24 to spiral spring 30, second driven gear 25, spiral spring 31, auxiliary axle housing 12, third driven gear 26 and finally to the differential housing 32. All the above transmissions are rotating at the same speed. The second driving gear 14 is rotating due to its interlocking with the driven gear 25, hence the extension housing 18 and its base plate 46 will rotate simultaneously. (Similarly the base plate of the third automatic shifting assembly 23 also rotates.) When the rotational speed of base plate 46 is below a set limit, the centrifugal force of dead weight 48 is less than the sum of its weight and the pulling force of the extension spring 51, this allows dead weight 48 to maintain its position and the gear is not shifted, as shown in FIG. 2. When the rotational speed of base plate 46 is higher than the set limit, the centrifugal force of dead weight 48 is higher than the sum of its weight and the pulling force of the extension spring 51, the position of dead weight 48 is offset due to the centrifugal force and the pivot point created by axle 47, as shown in FIG. 3. Axle 47 and its gear 49 therefore rotates to an appropriate angle, driving the driven gear 53 and the second gear driven mechanism 52 to another appropriate angle, as shown in the direction of Arrow A of FIG. 3. This rotation enables the transmission mechanism 20 of the second driving gear to press against the inner side and interlocks with mainshaft 11. (As shown in FIG. 5.) To clarify this phenomenon, when the car speed is exceeding a set limit, the second gear will automatically shift in due to the centrifugal action thus enabling the power of mainshaft 11 to transmit thru the second driving gear mechanism 20 to the second driving gear 14.

Figure 4:
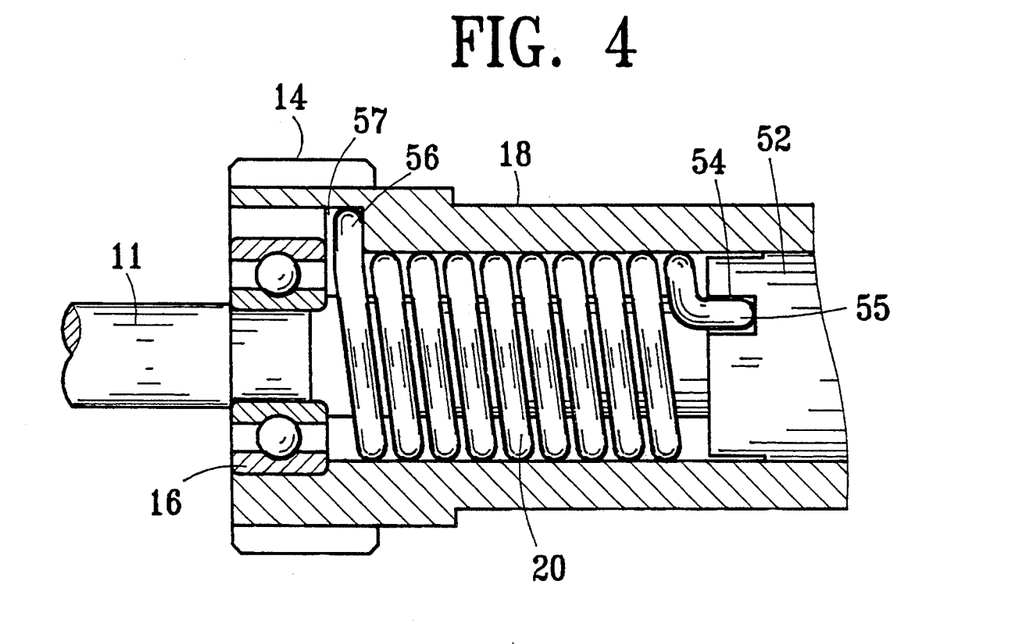
FIG. 4 is an enlarged sectional view of the transmission illustrating the second driving gear and its one-way spiral transmission disengaged from the main shaft.

As shown in FIG. 4, a slot 54 is shown close to one end of the second gear transmission mechanism 20. The slot 54 is engaged with the extended end 55 of mechanism 20, the other end 56 of mechanism 20 is engaged with slot 57 of the extension housing 18. When the car is running at low speed in first gear, the driven shifting part 52 of the second gear automatic shifting assembly 22 will remain stationary, pressing the transmission mechanism 20 to disengage with mainshaft 11, the power of mainshaft 11 cannot be transmitted to the second driving gear 14 thru the transmission mechanism 20; the ball bearing 16, which installed between the mainshaft 11 and the second driving gear 14, allows the mainshaft and the second driving gear to rotate at a different speed.

As shown in FIG. 5, when the car speed is exceeding a set limit, the driven shifting mechanism 52 of the second gear automatic shifting assembly 22 will rotate to an appropriate angle to a position as shown in FIG. 5, similar to the previous illustration. This leads to the rotation of the extension end 55 of the transmission mechanism 20, pressing the transmission mechanism 20 to interlock with the mainshaft, as shown in FIG. 5. At this time the normal rotation power of mainshaft 11 can directly transmit to the second driving 14 via the unidirectional transmission mechanism 20, causing the mainshaft 11 and the second driving gear 14 to be rotating at the same speed.

Figure 6:
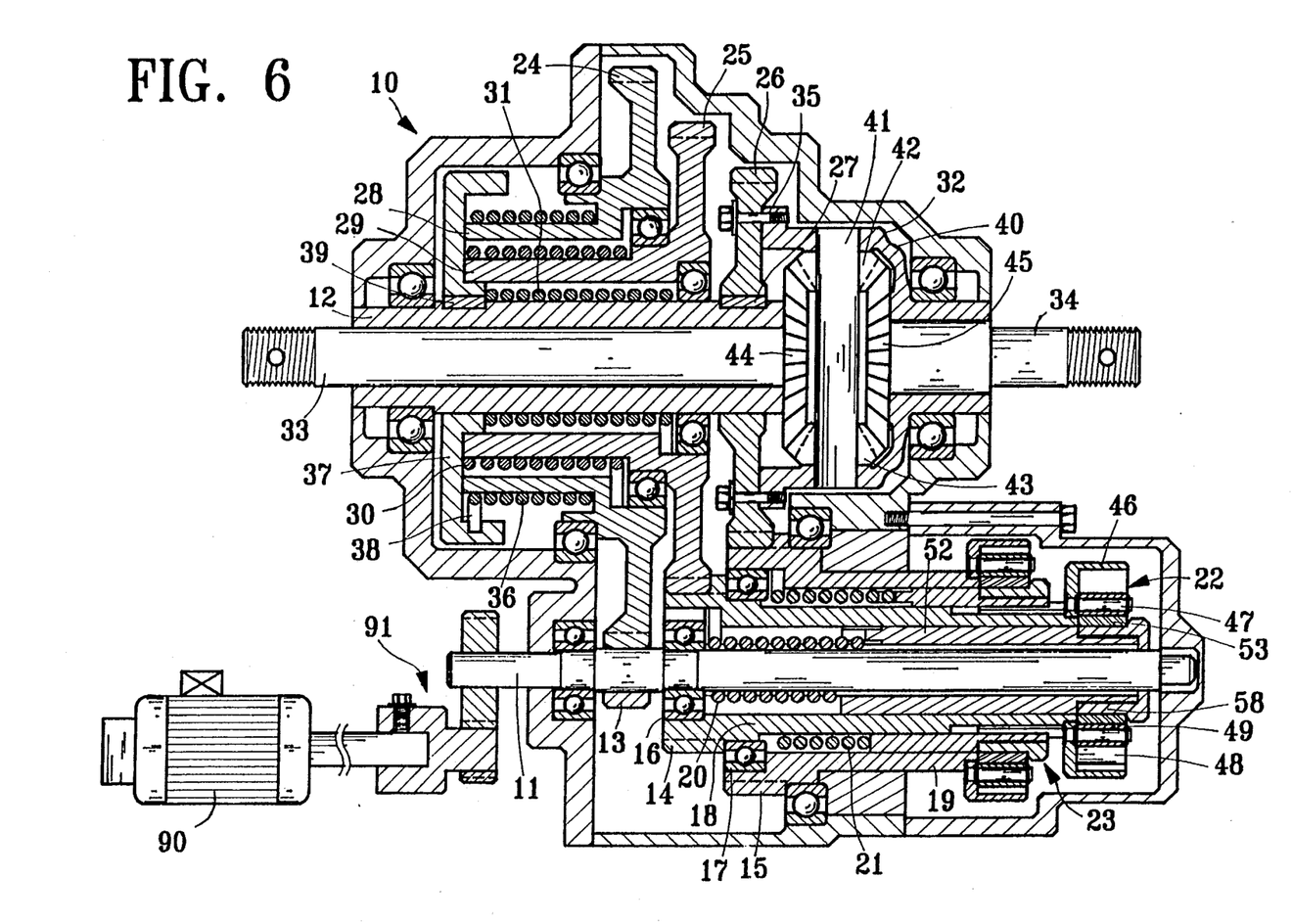
FIG. 6 is a sectional view similar to FIG. 1, except speed variable transmission is in its forward second gear position.

Referring to FIG. 6. When the car speed is exceeding a set limit, the second gear automatic shifting assembly 22 will press transmission mechanism 20 towards the inner side so as to interlock with mainshaft 11; causing the normal rotational power of mainshaft 11 simultaneously transmit to the first and the second driving gears 13 and 14, hence the gears 13 and 14 rotates at the same speed. Due to the different tooth ratio, the driven gears 24 and 25 that interlocked with the above driving gears, rotate at a different speed, the second driven gear 25 is rotating at a higher speed than the first driven gear 24. The spiral spring 30, located between extension housing 28 and 29, has a slippage phenomenon with the high speed extension housing 29 and thus cannot convert the high speed to extension housing 28, therefore this will not create an interaction between the first and the second driven gears 24 and 25 that are running at a different speed. Also when the transmission is in its second gear, the first driving gear 13 does not have to be disengaged with the first driven gear 24. When the variable speed transmission 10 is in its second gear forward, the second driven gear 25 transmit its power orderly to the spiral spring 31, auxiliary axle housing 12, the third driven gear 26 and the differential housing 32, causing all the above rotations to be the same as the second driven gear 25.

Figure 7:
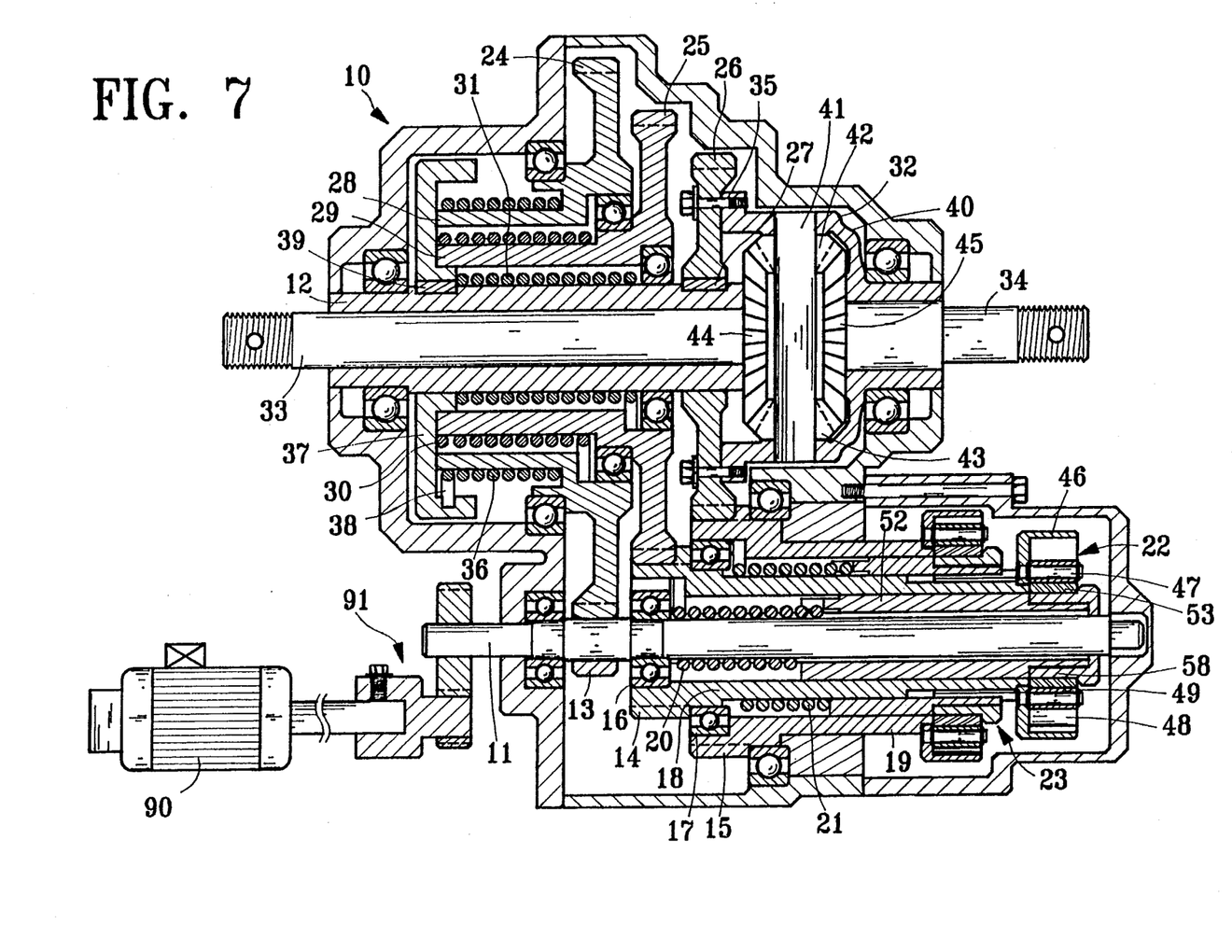
FIG. 7 is a sectional view similar to FIG. 1, except the speed variable transmission is in its forward third gear position.

Referring to FIG. 7, when the car is running at another higher set limit, the third gear automatic shifting assembly 23 will change gear from the second shift to the third shift. Assembly 23 rotates and presses the transmission mechanism 21 of the third driving gear towards the inner side to interlock with extension housing 18; therefore the normal power of mainshaft 11 can be transmitted simultaneously to the first, the second and the third driving gears 13, 14 and 15 respectively, enabling the three driving gears rotate at the same speed. The three driven gears 24, 25, 26 of the first, the second and the third shifts have a different tooth ratio among them and therefore rotate at a different speed. Among them the third driven gear 26 has the highest rotation speed and the first driven gear 24 has the lowest rotation speed. The one-way spiral spring 30 of the first driven gear (located between the extension housings 28 and 29 of the first and the second driven gears) and the similar spring 31 of the second driven gear (located between the extension housing 29 and the auxiliary axle housing 12) have a slippage phenomenon with extension housing 29 and the auxiliary axle housing 12 respectively, the power of the third driven gear 26 cannot be transmitted reversely to the first and second driven gears 24 and 25. Therefore the first gear pair 13 and 24 as well as the second gear pair 14 and 25 do not have to be disengaged when the variable speed transmission is in its third gear. When it is in third gear forward, the power from the third driven gear 26 is transmitted to the auxiliary axle housing 12 and the differential housing 32 respectively. The three maintain the same speed of rotation.

Figure 8:
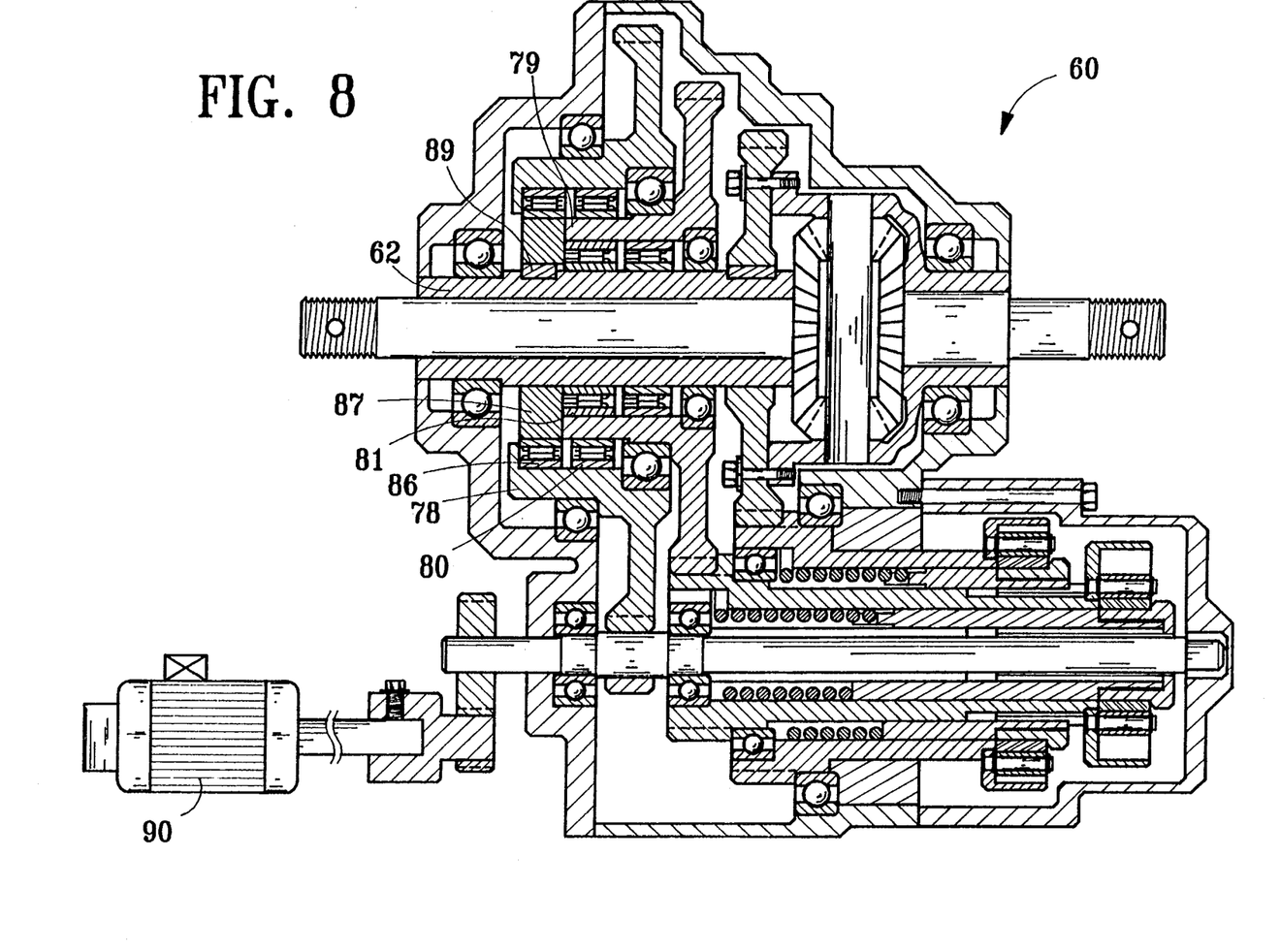

Referring to FIG. 8, the second embodiment of this invention for variable speed transmission 60. This variable speed transmission 60 has a mechanical structure similar to the variable speed transmission 10, as illustrated in FIG. 1 thru FIG. 7. The transmission of power between the extension housing 78 (of the first driven gear) and the extension housing 79 (of the second driven gear) is by the first gear's one-way bearing 80. When the dc motor is rotating in its forward direction, this bearing 80 can only transmit the power from extension housing 78 to extension housing 79, but bearing 80 will not be operational when the dc motor is rotating in its reverse direction. There exists at least one second gear bearing 81, located between extension housing 79 (of the second gear) and the auxiliary axle housing 62. When the motor is rotating in its normal direction, this bearing 81 can transmit the power of extension housing 79 to the auxiliary axle housing 62. In addition to these, the reverse gear driven assembly 87 is locked to auxiliary axle housing 62 by the flat key 89; the reverse gear bearing 86 is installed between extension housing 78 (of the first driven gear) and the reverse gear driven assembly 87. When the dc motor is rotating in its reverse direction, this bearing 86 can transmit, one way only, the power of extension housing 78 (of the first driven gear) to the reverse gear driven assembly 87. The major difference between the variable speed drives 10 and 60 is: the replacement of the spiral spring with the bearing, the rest of the mechanical structure are basically similar.

This invention provides a Full meshing gear Type Variable Speed transmission to be used in electric cars. Besides being lighter in weight and smaller in physical size, it has the following distinctive features as compared to conventional variable speed transmission:

(1) Using full gears pair to transmit the power to obtain the highest transmission efficiency. This high transmission efficiency can improve the overall energy efficiency of the electric car, extend the battery life and prolong the travel distance.

(2) Besides using the full gears pair to transmit the power, this variable speed transmission can also shift the gear automatically based on the driving speed, this eliminates the clutch and the shift lever for ease of operation. This invention has the advantages of conventional manual transmission and automatic transmission but does not have their disadvantages.

(3) Using fewer pairs of transmission gears to obtain more variable speed control.

(4) Using fewer pairs of transmission gears but does not affect the function of the variable speed transmission. This makes its mechanical structure to be as simple as a speed reduction assembly. It has the advantages of small size, light weight and high transmission efficiency.

Many changes and modifications in the above described embodiment of the invention can, of course, be carried out without departing from the scope thereof. Accordingly, to promote the progress in science and the useful arts, the invention is disclosed and is intended to be limited by the scope of the appended claims.

What is claimed is:

1. A variable speed transmission for electric car, comprising:
    a dynamic power source;
    a mainshaft operatively connected to the dynamic source;
    a transmission housing;
    an auxiliary axle housing
    in which power from the mainshaft is transmitted to a plurality of different pairs of gears in the transmission housing, each pair of gears comprising a driving gear and a driven gear that are meshed with each other, the number of gear teeth of this driving gear is increasing from a primary driving gear and decreasing to a final driven gear, the primary driving gear being directly attached to and rotated synchronously with the mainshaft while the rest of the driving gears have individual extension housings interlocked to the mainshaft from an inner end to an outer end in an alternating order such that the mainshaft cannot directly transmit its power to these driving gears, the final driven gear being directly attached to the auxiliary axle housing thus the two such that they can rotate synchronously, the driven gears having individual extension housings interlocked to an exterior of the auxiliary axle housing from an outer end to an inner end in an alternating order such that the driven gears can rotate the auxiliary axle housing
    only when the mainshaft is rotating in a forward direction by transmitting its power to a one-way spiral spring of a second driven gear and the rest of the gears, one-way spiral spring of the driving gears installed between the extension housing of the second main gear and the main shaft, and between two adjacent extension housings of the driving gears, each spiral spring of the driving gears being interlocked to the extension housing of the next higher driving gear such that each pair can rotate synchronously, whereby each spiral spring of a driving gear may be compressed against the mainshaft and extension housing of a lower driving gear thereby enabling the driving gear to be rotated by the mainshaft;
    further one-way spiral springs installed between adjacent extension housings of the driven gears and between the extension housing of the next to the last driven gear and the auxiliary axle housing, Such that each of the further one-way spiral springs transmits its power to the auxiliary housing when the mainshaft is rotating in a forward direction, whereby the further spiral spring allows an extension housing of a lower driven gear to rotate at a lower speed than an extension housing of a higher driven gear;
    a reverse gear driven assembly directly attached to the auxiliary axle housing so as to rotate synchronously with the auxiliary axle housing;
    a reverse gear spiral spring installed between an extension housing of the primary driven gear and the reverse gear driven assembly, whereby the reverse gear spiral spring can transmit power on the extension housing of the primary driven gear to the reverse gear assembly when the mainshaft is rotating in a reverse direction; and
    a plurality of automatic gravity type shifting assemblies installed in the extension housings of the driving gears, each automatic gravity type shifting assembly interlocking with a one-way spiral spring of the driving gear by a driven shifting part, such that centrifugal action the shifting part to shift from a holding position when the auxiliary axle housing rotational speed is less than a pro-set limit of the automatic gravity type shifting assembly, whereby the shifting part does not interlock with a spiral spring of the driving gear and thus it cannot directly be driven by the mainshaft to a driving position in which the spiral spring of the driving gear is compressed inward towards one of the mainshaft and the extension housing of a lower gear and then rotated synchronously when the shifting part is shifted to a position whereby in gear, and power is transmitted ,from the mainshaft to the extension housing of the higher gear, thus the mainshaft and the auxiliary axle housing will have a variable speed ratio.

2. A variable speed transmission, as claimed in claim 1 further comprising:
    a pair of axle shafts; and a differential assembly Operatively interposed between the axle shafts and the auxiliary axle housing whereby the differential .assembly rotates synchronously with the final gear and drives the axle shafts so as to allow the axle shafts to rotate at different speeds.

3. variable speed transmission as claimed in claim 1 wherein each automatic gravity type shifting assembly comprises:
- a base plate interlocking with the extension housing of the driving gear and rotating synchronously with the extension housing;
- a plurality of rotatable axles on the base plate;
- an individual gear integrated with each rotatable axle so as to rotate synchronously with its corresponding axle;
- a second driven gear attached to the extension housing meshing with the gear individual of the shifting mechanism; and
- a dead weight attached to the rotatable axle, being pulled to the second driven gear by a spring so that the individual gear and the second driven gear pair enables the shifting part to move to its holding position, by centrifugal force overcoming the pulling force of the spring to cause the dead weight to move outwardly when the rotational speed of the base plate exceeds a set limit, to consequently, shift the shifting part, 4. A variable speed transmission as claimed in claim 1 wherein the one-way spiral spring for the driven gear and the one-way spiral spring for the reverse gear are opposite in their spiral directions.

* * * * *